(12) United States Patent
Shultz et al.

(10) Patent No.: US 12,042,763 B2
(45) Date of Patent: Jul. 23, 2024

(54) CARBON-SEQUESTERING DESALINATION BRINE WASTE PROCESSING SYSTEM AND METHOD THEREOF

(71) Applicants: Larry M. Shultz, Beverly Hills, CA (US); George E. Snider, Vero Beach, FL (US); Darin Diorio, Wytheville, VA (US)

(72) Inventors: Larry M. Shultz, Beverly Hills, CA (US); George E. Snider, Vero Beach, FL (US); Darin Diorio, Wytheville, VA (US)

( * ) Notice: Subject to any disclaimer, the term of this patent is extended or adjusted under 35 U.S.C. 154(b) by 0 days.

(21) Appl. No.: 18/060,709

(22) Filed: Dec. 1, 2022

(65) Prior Publication Data

US 2024/0181383 A1  Jun. 6, 2024

(51) Int. Cl.

| | | |
|---|---|---|
| *B01D 53/14* | (2006.01) | |
| *B01D 1/00* | (2006.01) | |
| *B01D 1/16* | (2006.01) | |
| *B01D 3/06* | (2006.01) | |
| *B01D 5/00* | (2006.01) | |
| *B01D 53/18* | (2006.01) | |
| *C02F 1/06* | (2023.01) | |

(52) U.S. Cl.
CPC ....... *B01D 53/1418* (2013.01); *B01D 1/0082* (2013.01); *B01D 1/16* (2013.01); *B01D 3/06* (2013.01); *B01D 5/006* (2013.01); *B01D 53/1475* (2013.01); *B01D 53/1493* (2013.01); *B01D 53/18* (2013.01); *C02F 1/06* (2013.01); *B01D 2252/1035* (2013.01); *B01D 2257/502* (2013.01); *B01D 2257/504* (2013.01)

(58) Field of Classification Search
CPC ............ B01D 53/1418; B01D 53/1475; B01D 53/1493; B01D 53/18; B01D 1/0082; B01D 3/06; B01D 5/006; B01D 2252/1035; B01D 2257/502; B01D 2257/504; C02F 1/06
USPC ......................................................... 423/220
See application file for complete search history.

(56) References Cited

U.S. PATENT DOCUMENTS

2021/0039044 A1\*  2/2021  Alamoudi .............. B01D 53/62

\* cited by examiner

*Primary Examiner* — Anita Nassiri-Motlagh
(74) *Attorney, Agent, or Firm* — Rivka Friedman

(57) ABSTRACT

The invention relates to a carbon-sequestering desalination brine waste processing system comprising a carbon sequestration system and a plurality of brine removal system for a desalinization plant. The carbon sequestration system is configured to receive brine from a brine source and inject at least one of $CO_2$ or $CO$ into the brine to provide carbon sequestrated brine. The plurality of brine removal systems are connected in series or parallel and sequentially extract brine and water vapor from the carbon sequestrated brine. Each brine removal system includes at least one atomizing unit for spray atomization and vacuum flashing the carbon sequestrated brine into atomized water vapor and concentrated brine. Further, each subsequent brine removal system includes at least one mineral extraction unit allowing sequential removal of minerals from the concentrated brine received from a previous brine removal system, and provide minerals and stable carbon products, till substantially zero brine discharge is achieved.

20 Claims, 7 Drawing Sheets

CARBON-SEQUESTERING DESALINATION BRINE WASTE PROCESSING SYSTEM AND METHOD THEREOF

FIELD OF THE INVENTION

The present invention relates to the field of carbon-sequestration and the desalinization of seawater with its concentrated waste products of brine. More particularly, the invention relates to a system, method and apparatus for carbon sequestration and desalinization of brine waste for extraction of freshwater and useful by-products and mineral constituents of brine.

BACKGROUND OF THE INVENTION

Increased population growth and industrialization are one of the major reasons for causing cities and regions around the world to run out of usable or fresh water. Some natural causes for the scarcity of fresh water, which are now even more frequent than ever are climate change, heat waves, droughts, and accelerated melting of glacier snow that foretell a bleak future of freshwater shortages in the near future.

Water is so important that rivers have been dammed, aqueducts built to transport it from distant locations and wars fought to protect its continued ownership. Icebergs in the Arctic and Antarctic continue to be proposed to be towed to large cities to supply fresh water. Now, with the advancement of innovative technologies, diverse alternative water supplies for both drinking water and agriculture need to be deployed so as to fulfill the basic necessities for human survival.

One method for obtaining an alternative source of potable freshwater is through desalinization. Desalinization is the process of separating fresh water from a solution of water and ions, for example, removing dissolved salts or other impurities in seawater. All these impurities need to be removed to make the water potable for human consumption.

In a water desalinization plant, similar to a power generation plant, the process usually depends on burning of fossil fuel resources, such as natural gas, oil and coal, to drive the heating and separation processes. Such plants usually implement rotating machinery to convert the thermal energy obtained from the combustion of hydrocarbons to mechanical energy, and then convert the mechanical energy again into electrical energy using a generator to power water pumps and the desalinization process.

Various desalinization processes are utilized to extract freshwater resources, including membrane-based and thermal-based processes. Solar distillation mimics the natural water cycle, in which the sun heats the seawater enough for evaporation to occur. After evaporation, the water vapor is condensed onto a cool surface for recovery. Other forms of desalinization include vacuum distillation desalinization, multi-stage flash distillation desalinization, multiple-effect distillation desalinization, vapor-compression distillation desalinization, reverse osmosis desalinization, freeze-thaw desalinization, electro-dialysis membrane desalinization, membrane distillation desalinization, forward osmosis desalinization, or wave-powered desalinization.

Conventional desalinization plants have historically created a number of environmental issues. More particularly, regardless of the method used, the existing conventional methods are able to recover only about 30% to 40% of the freshwater from the seawater. The remaining 60%-70% that is left is a highly concentrated waste product, called "brine", which has salinity concentrations several times that of normal seawater. Historically, desalinization plants dispose of their brine waste by ultimately discharging it into the ocean or sea, leading to disastrous consequences to local flora and marine life.

Thus, simply rejecting hot, salty brine into the sea is not an environmentally acceptable solution, especially in marine environments in regions with low turbidity and high evaporation that already have an elevated salinity. Examples of such locations are the Persian Gulf, the Red Sea and, in particular coral lagoons of atolls and other tropical islands around the world. Because the brine is denser and heavier than the surrounding sea water, the ecosystems on the seabed are most at risk because the brine sinks and remains there long enough to suffocate, deoxygenate, and Carbon dioxide is a major contributor to global warming, which is one of the most serious environmental problems facing society. Carbon dioxide is believed to have the greatest adverse impact on the observed greenhouse effect causing approximately 55% of global warming.

Some of the typical methods implemented to reduce carbon dioxide emissions include Carbon Capture and Storage (CCS), which is based on the separation and capture of carbon dioxide produced by fossil fuel power plants, oil refineries, industrial factories and other sources, either before or after combustion. A number of $CO_2$ capture technologies have been used such as oxy-fuel combustion, pre-combustion decarbonization, post-combustion processing and chemical looping combustion. Among the post-combustion capture techniques, the most promising and most effective are adsorption using solid sorbents, membrane separation, and cryogenic fractionation technology.

Other conventional ways to capture $CO_2$ include chemical solvent absorption using liquids such as amines or aqueous solutions of bases, physical absorption in an appropriate solution, and membrane separation. However, all of the above stated methods have certain limitation and problem, such that the absorption media need to be regenerated without losing $CO_2$.

Further, some other alternative sequestration techniques include injecting $CO_2$ gas or liquid into underground geological formations, salt caverns, depleted oil and gas reservoirs, or in deep ocean layers. However, very specific geological configurations are required for disposal of the $CO_2$, and these are not commonly available at all $CO_2$ emission sites. Thus, transportation adds substantial cost and difficulty. In addition, it is still not known if $CO_2$ can be permanently sequestered underground without surface leaks.

US patent publication U.S. Ser. No. 11/034,605B2 discloses an apparatus, system and method to provide purified water and removed valuable metals and minerals. Said patent lacks the sequential processing of the concentrated brine into a substantially zero brine discharge.

Yet another US patent publication U.S. Pat. No. 8,137,444B2 discloses a systems and methods for lowering levels of carbon dioxide and other atmospheric pollutants. Then another US patent publication U.S. Pat. No. 9,260,314B2 talks about methods provided for producing a composition comprising carbonates, wherein the methods comprise utilizing waste sources of metal oxides. An aqueous solution of divalent cations, some or all of which are derived from a waste source of metal oxides, may be contacted with $CO_2$ and subjected to precipitation conditions to provide compositions comprising carbonates. Further, another US patent publication U.S. Ser. No. 10/246,349B2 talks about a method of desalinating water through application of acoustic pressure shock waves to slush to separate ice crystals from brine and recovering desalinated water from the separated ice crystals.

Some $CO_2$ capture methods employed by the conventional desalinization system react $CO_2$ (or carbonic acid formed from water and $CO_2$) with an aqueous solution of an alkali to form a carbonate. However, a significant drawback of this approach is that the carbonate exits the process in solution with water, requiring further, energy intensive treatment to separate the solids and the water, or it results in a large-volume, heavy, wet, cement-like paste that requires energy intensive drying and mechanical systems to control the size, configuration and weight of the resulting dried product. Further, the above discussed conventional systems and methods are found deficient in terms of an energy efficient desalinization system that can be employed at a comparatively low temperature and at a cheaper operational cost in order to convert seawater into a potable source of fresh water with zero brine discharge into the sea.

According to U.S. Department of Energy (DOE), it is estimated that between 20% to 50% of the energy input in industrial facilities is lost as waste heat in the form of hot exhaust gases, cooling water, and heat lost from hot equipment surfaces and heated products, which waste heat is sufficiently able to be recovered and utilized to drive other industrial processes, including desalination.

Besides the population of every coastal city needing their own guaranteed local supply of refined fossil fuels, electricity and freshwater resources to economically thrive in the face of increasing resource scarcity, the best location for an ocean desalinization facility is ideally near a power plant, oil refinery or industrial facility whose process-heat or waste-heat can be used to vaporize water to drive a thermal desalinization process for co-generating freshwater supplies and electricity for a power plant, or co-generating freshwater and distillate fuels for an oil refinery.

As today's population of 8-billion people grows to 9-billion over the next decade, demand for distillate fuels and building materials, such as cement, will continue to increase. So will the need for alternative cements that require less energy and produce less carbon emissions than current Portland cement formulations. While cement is the most ubiquitous manufactured and widely consumed product on Earth, with approximately 3-billion tons produced each year, the manufacturing of cement for use in concrete structures now accounts for at least 8% eight percent of the entire world's $CO_2$ emissions, which will only continue to grow as population grows this century. Therefore, there is a compelling need to develop alternative building materials and cements with same or better strengths but smaller carbon-footprints than the Moreover, since cement manufacturing and cement-based building materials will always be needed to meet growing population requirements, there is a compelling need for manufacturing sustainable carbon-neutral and carbon-absorbing cements and other alternative building materials capable of fixing and sequestering carbon emissions from the environment over their lifetimes, with the same or better construction strength and durability than the current global standard of Portland cement, which releases carbon dioxide as it hardens over its lifetime.

In consideration of the foregoing, a significant need exists for systems and methods that aid in solving the problems relating to desalinization of seawater efficiently and economically. In particular, there is a need for a commercially viable carbon capture and sequestration process that works at industrial scales that is complete and permanent. Specifically, there is a need for a carbon capture system that does not use capture media that require complex and energy-intensive regeneration, does not yield a heavy, wet end-product that requires energy-intensive drying and other post-capture processing, and does not require expensive pipeline infrastructure to transport and inject captured-CO2 into faraway oil fields or salt domes. Accordingly, there is a need for providing a system with an eco-friendly and highly sustainable process and related systems for generating fresh water along with a negligible or substantially zero brine discharge into the sea as waste.

SUMMARY OF THE INVENTION

The present invention relates to a system, method and apparatus for processing brine to recover water, minerals and other useful by-products of the process and generate a zero brine discharge (ZBD). More particularly, the system and/or method as disclosed allows for step-wise processing of the brine in a manner that helps achieve ZBD at the end. The system and/or method also allows combining industrial heat-generating facilities with the desalinization system, thus saving on energy and at the same time generating large volumes of freshwater simultaneously.

In consideration of the problems pertaining to the conventional systems, an objective of the present invention is to provide a system and a method that can conveniently and economically provide an efficient way of disposal of the brine, where the brine is recirculated back into the system until the brine is broken down into its constituent components of value to recycle, recover and re-use in tandem with the existing desalinization system. Thereby, aiding in solving the problems prominent in the conventional systems and methods without harming the environment and leveraging available existing heat sources.

Another objective of the present invention is to provide a system and method for processing a brine waste which may also involve the removal of salts from agricultural run-off water, oil field produced-water and/or brackish ground water brines to produce potable water.

Yet another objective of the present invention is to recover and use the thermal energy lost as industrial waste heat in the form of hot exhaust gases, cooling water, and heat lost from hot equipment surfaces and heated products, and utilizing it in the system of the present invention, thereby, saving cost, reducing environmental impact, and improving work flow and productivity Another objective of the present invention is to provide a new eco-friendly cement alternative, which can exclusively be extracted from the waste brine, in accordance with the present invention, for use as sustainable cement that beneficially absorbs carbon over its lifetime.

Another objective of the present invention is to provide a new method of carbon-sequestration that makes productive use of locally-captured CO2 and CO gases for use in local industrial processes (like desalination), instead of having to incur the higher sequestration cost of transporting captured-carbon by pipeline as a waste-product for injection into faraway disposal wells and abandoned oil fields.

Another objective of the present invention is to provide a system and method that produces zero brine discharge, where waste brine is not disposed back into the ocean, but instead is saved, dewatered, extracted and harnessed for the valuable minerals, metals and components of value to recycle, recover and re-use.

Yet another objective of the present invention is to promote reduction in the overall complexities and cost of the existing desalinization and mineral extraction system and methods in one continuous but sequential set-up.

In accordance with an aspect of the present invention, a brine waste processing system includes a carbon sequestration system and a plurality of brine removal systems. The carbon sequestration system is configured to receive brine from a brine source, such as from an existing ocean desalination plant, and inject at least one of carbon dioxide and carbon monoxide into the brine to provide carbon sequestrated brine. A plurality of brine removal systems connected in series or parallel are configured to sequentially extract brine and water vapor from the carbon sequestrated brine, wherein each of the brine removal systems includes at least one atomizing unit configured to atomize the carbon sequestrated brine into concentrated brine and water vapor. Each subsequent brine removal system includes at least one mineral extraction unit to extract one or more minerals from the concentrated brine received from a previous brine removal system to provide a stable carbonate product and a substantially zero brine discharge.

In one embodiment, the injectants can be injected into the Phase Chamber with both constant-flow injection capability and pulsed-flow injection of either or both of the brine feedstock and CO2/CO injectants sequentially in each Phase Chamber with varying pulsation-duration, timing, flowrate and pressurization control of injectants for optimal mixing and molecular bonding of the feedstock and CO2.

In an embodiment, the brine removal system includes a brine product system comprising a chamber for selectively separating and collecting the water vapor and the concentrated brine and a brine recirculation system for recirculating a part of the concentrated brine back to the chamber, with the rest of the concentrated brine being fed to a subsequent brine removal system flow connected in series for further brine removal.

In an embodiment, each brine removal system comprises a condensing system for condensing the desalinated water vapor into fresh water.

In an embodiment, the mineral extraction unit comprises an ion exchange system, wherein the ion exchange system of each subsequent brine removal system is configured to extract a mineral from the concentrated brine collected from the previous brine removal system.

In an embodiment, the brine waste processing system includes at least one industrial waste heat source or concentrated solar or geothermal heat source or fossil-fueled combustion exhaust heat source In an embodiment, the carbon sequestration system receives the heat from the at least one waste heat source for heating the carbon sequestrated brine prior to introducing the carbon sequestrated brine into the brine removal system. In an embodiment, the brine waste processing system comprises at least one magnetic device to break molecular bonds of the brine, wherein the brine from the brine source is passed through the at least one magnetic device prior to introduction into the chamber.

In an embodiment, the stable carbonate product comprises at least one of gypsum, magnesium, building materials and alike.

In an aspect of the invention, a brine removal system includes:
a plurality of brine phase chambers configured to receive carbon sequestrated brine and separate water from the carbon sequestrated brine stage-wise to provide concentrated brine and usable water, wherein each brine phase chamber comprises at least one atomizing unit for atomizing the received brine into an atomized water vapor and concentrated brine,
wherein the concentrated brine received from a first of the plurality of brine phase chambers is transferred to a next brine phase chamber to sequentially remove, by at least one mineral extraction unit, one or more minerals from the concentrated brine in each subsequent brine phase chamber till the collection of a stable carbonate product and a substantially zero brine discharge is received.

In an embodiment, the atomizing unit includes a plurality of atomizing nozzles that allows spray atomization and vacuum flashing of the carbon sequestrated brine as received, under predefined conditions, to provide atomized water vapor.

In an embodiment, the mineral extraction unit comprises an ion exchange system, wherein the ion exchange system of each subsequent brine removal system is configured to extract a mineral from the concentrated brine collected from the previous brine removal system.

In an embodiment, the system comprises a water vapor gas return system having a gas trap configured to the condenser.

In an embodiment, the system comprises a control system for selectively controlling the predefined conditions including at least one of a temperature, a chamber pressure, and a vapor flow rate in the chamber for setting a cut-point in the chamber between the water vapor and brine solution.

In an embodiment, the predefined conditions are maintained by selecting temperature in a range of 250-600 F, the chamber input pressure in a range of 1375 to 6700 KPa and the pressure of the chamber in a range of 0-30 in Hg during flash atomization of the carbon sequestrated brine.

In an embodiment, the system comprises a blower system within the chamber to maintain a vapor flow rate within the chamber in the range of 3-20 feet/second.

In an aspect of the invention, a brine waste processing method includes the following steps:
a. receiving a brine from a brine source;
b. carbon sequestrating the brine with at least one of carbon dioxide and or carbon monoxide to provide carbon sequestrated brine;
c. atomizing the carbon sequestrated brine by spray atomization and vacuum flashing in a plurality of brine phase chambers serially connected to one another, stage-wise to separate a concentrated brine solution and water vapor, under predefined conditions;
a. collecting the water vapor, through condensation, to provide usable water;
d. extracting one or more minerals from the concentrated brine received from a previous brine phase chamber till a stable carbonate product/and a substantially zero brine discharge is received.

In an embodiment, the step of collecting comprises recirculating uncondensed water vapor to the chamber In an embodiment, the method comprises recirculating a portion of the concentrated brine back to the chamber for re-atomization and separation.

In an embodiment, the method comprises mixing the uncondensed vapor with a carrier gas and introducing the mixture into the chamber, wherein the carrier gas is an inert gas.

In an embodiment, the method comprises bleeding excess gasses out of the condenser, to a scrubber unit and venting to atmosphere.

In an embodiment, the method comprises independently controlling a brine flow rate, a brine solution recirculation rate and a brine product removal rate.

In an embodiment, the extracting comprises extraction technologies selected from at least one of a centrifuge, electro dialysis, membranes, nano-filters, ion exchange, ultrasonics, adsorption, and solvent-extraction, precipitation, mineralization and crystallization technologies in sequence Various objects, features, aspects, and advantages of the inventive subject matter will become more apparent from the following detailed description of preferred embodiments, along with the accompanying drawing figures in which like numerals represent like components.

DETAILED DESCRIPTION OF THE INVENTION

The embodiments herein and the various features and advantageous details thereof are explained more fully with reference to the non-limiting embodiments that are illustrated in the accompanying drawings and the following description. The invention relates to the utilization of the waste brine, irrespective of the source from which it is obtained and allows a series of processing steps to remove one or more minerals from the concentrated brine in each subsequent brine phase chamber till a substantially zero brine discharge is received.

The brine waste processing system for incorporation in a desalination system is designed to harness waste heat from a separate process for example an oil refinery, power plant, or any industrial process that generates heat. By transferring the waste heat from a primary process through the desalination system, the energy required by the primary process is reduced resulting in less emissions produced, lower operating cost and extended equipment life.

The present invention utilizes CO2 for carbon sequestration preferably obtained from primary cycle facilities, such as coal, natural gas or diesel fired power plants, steel works, cement factories or petroleum refineries, and from other external CO2-sources, whose owners are obligated to reduce their Corporate or Government CO2 emissions or footprints by sequestering industrial-size volumes of CO2 waste-gas for precipitation and fixation of waste-brine into recovered materials and chemical-compounds of value for local market and industrial use.

The brine discharge contains elements like Ca, Si, Na, Mg, Al, Cl, and Fe with main compounds in brine sludge samples being calcium carbonate, sodium chloride, magnesium hydroxide, and solar cell-quality quartz. The undesired inorganic cations present in the brine waste may be removed either partially or entirely by selectively binding those ions with a binding agent, such as a cation exchange resin.

Further, the chemical compounds present in brine can also combine with $CO_2$ to precipitate carbonates that can sequester gaseous carbon emissions into stable carbonate products, like precipitated limestone calcite Calcium Carbonates, used as additives in a wide range of consumer and industrial products.

The Phase Chamber operates by creating an ideal environment for separation of seawater or brine molecule. A combination of precise seawater or brine atomization including heat, pressure, velocity, and air flow into an environment that is sub-atmospheric enabling the chamber to target and separate seawater or brine instantly and continuously in a "single pass" operation.

Therefore, the present invention provides an efficient brine waste processing system in order to consume less net energy than usually required and provides a simple and yet cost effective system in respect of the existing desalinization and mineral extraction facilities.

Figure 1A:
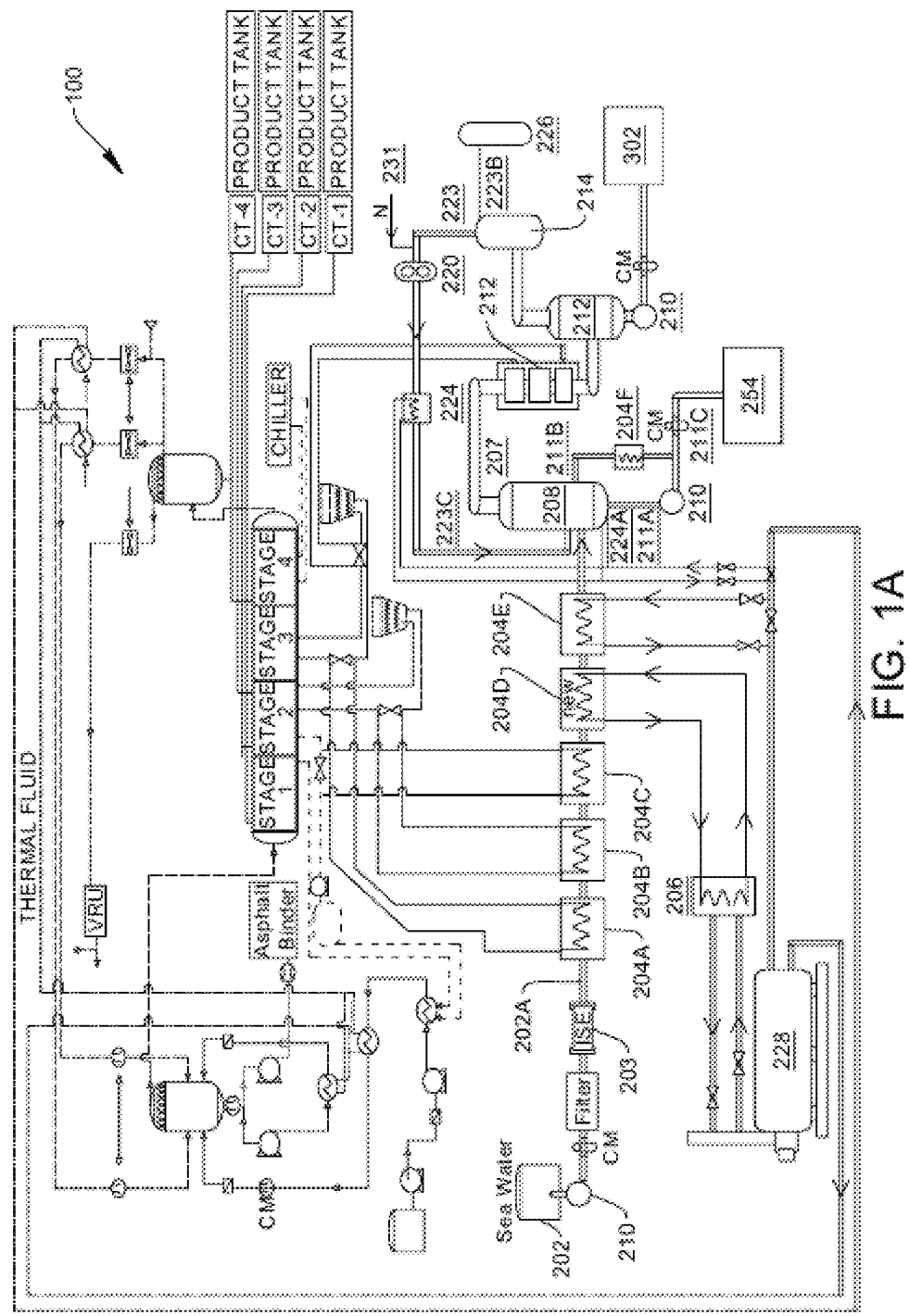
FIG. 1A illustrates a desalinization plant having a brine waste processing system in accordance with one embodiment of the invention.
Figure 1B:
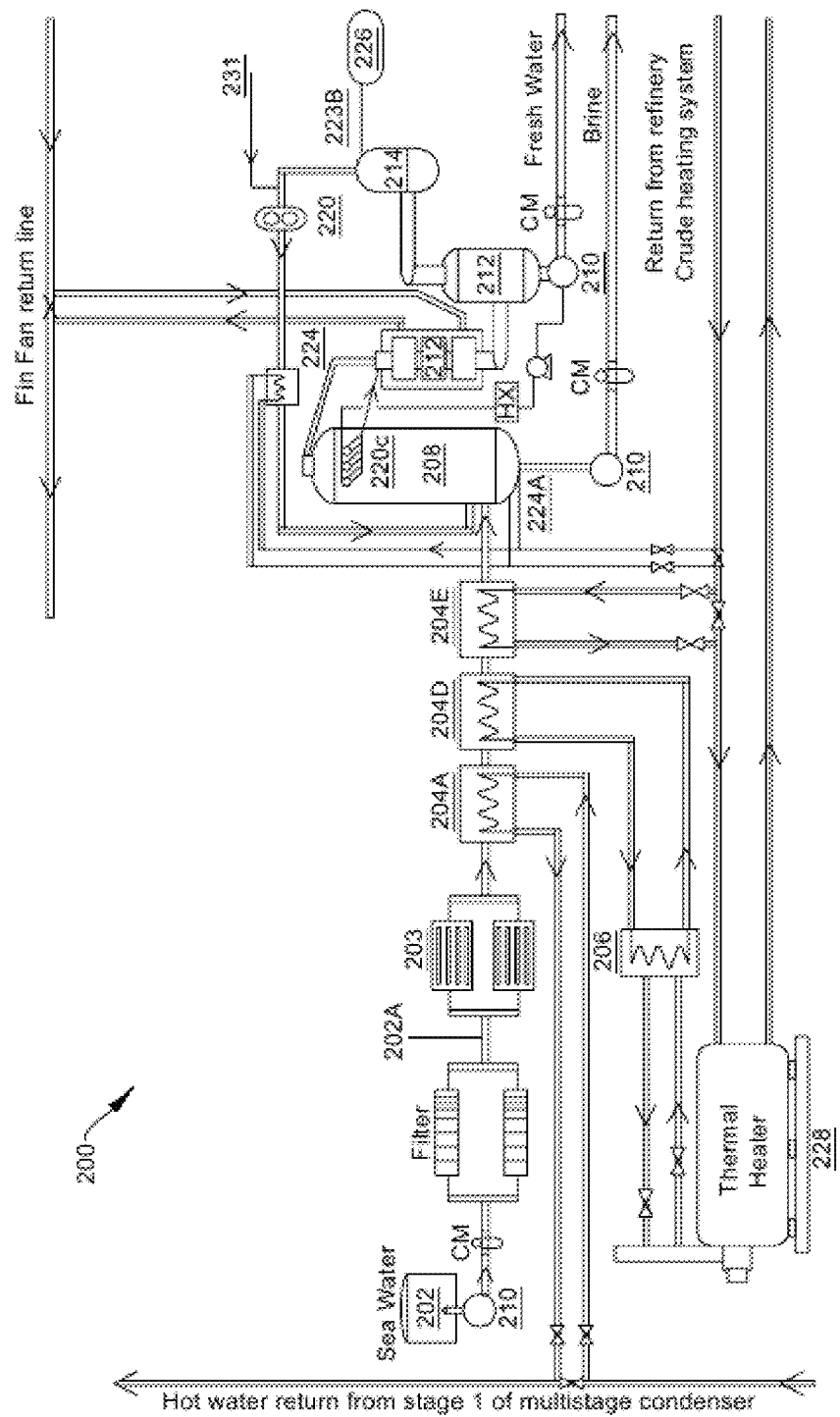
FIG. 1B illustrates a brine removal system of the brine waste processing system in accordance with one embodiment of the invention.
Figure 1C:
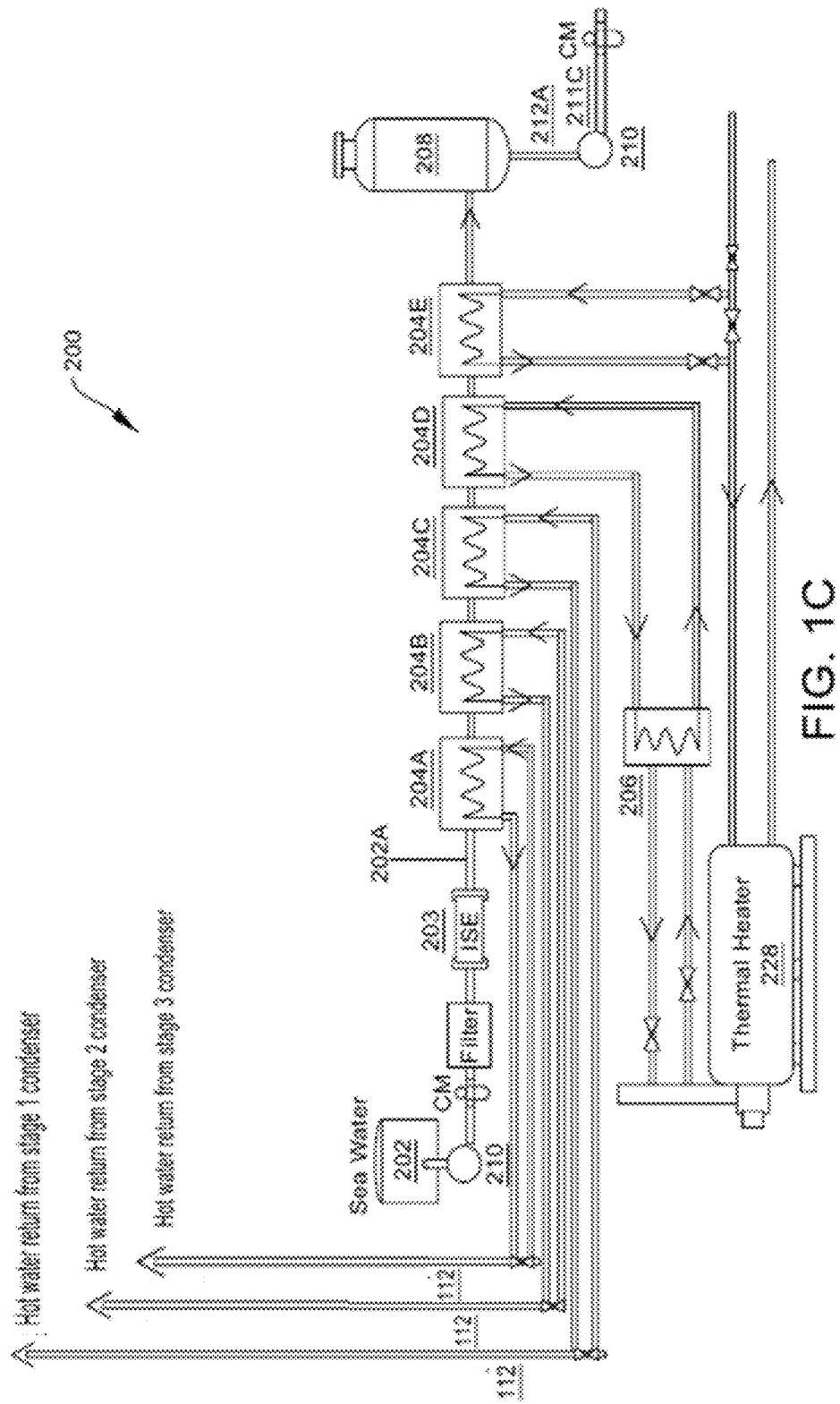
FIG. 1C illustrates the brine removal system with various waste heat sources from a refinery multistage condenser, heater flue stack heat and thermal heat from its own thermal heater in accordance with one embodiment of the invention.

With regard to FIGS. 1A, 1B and 1C, a desalinization plant 100 incorporating the brine waste processing system of the present invention is disclosed in accordance with one or more embodiments. The brine waste processing system 200 includes a phase chamber 208, a condensing system 212, a brine collection and recirculation system (BRS) 211b and a water vapor recirculation system (WVRS) 223. These systems are defined as the production unit (PU) that can be operatively linked together to scale processing capacity at a plant.

As shown, seawater or brine feedstock 202a from a storage tank 202 is passed through a 10 micron filter to remove solids from the seawater or brine. The filtered brine enters a magnetic field of a magnetic device 203 where a sodium chloride bond is broken. Further, the received brine is heated by heat exchangers 204a, 204b, 204c, 204d and 204e and is introduced into the phase chamber 208 to effect brine and water vapor separation at a desired cut point under vacuum flashing conditions. The brine solution 211a is removed from the bottom of the chamber where a portion 211b is selectively returned to the chamber using the BRS and a second path for rest of the brine 211c is selectively removed as concentrated brine to be delivered to the brine product storage tank 254. Simultaneously, water vapor 207 is removed from a top of the chamber and is carried to the condensing system 212. The water vapor 207 is condensed in a sectioned-cooling system within the condenser to produce water that is delivered to water storage tanks 302. Uncondensed gases from the condenser are delivered to the WVRS 223 where a portion 223c of the uncondensed gases is selectively returned to the chamber and a second portion 223b is passed through a scrubber unit 226.

In an embodiment, various heat sources can be harnessed to heat up the brine at various stages, for example, from an oil processing facility or refinery. Further, a cooling media is required for cooling the water vapor as well. The cooling media is made to travel from a fin fan or chiller to the condensing systems where it condenses the hot hydrocarbon vapor operating between 500-1000 F. This process raises the temperature of the media before returning it to the fin fan to be cooled again, by harnessing the media prior to its return to the fin fan, while additional heat is removed by passing it through heat exchangers 204A, 204B, 204C, or 204D, thus heating the seawater or brine to 200-600 F before returning to its source. The hot seawater or brine is pressurized to remain in the liquid phase until it enters the phase chamber where it is vaporized.

In various embodiments, the system includes various combinations to transfer the concentrated brine into next brine phase chamber for allowing the sequential removal of the one or more minerals from the concentrated brine to collect fresh water. The invention is further objected to collect finished industrial product in the form of stable carbonates at the end of subsequent processing in the brine phase chamber.

With reference to FIGS. 1A, 1B, and 1C various embodiments are described with additional details of each section of the chamber system and its operation.

Brine Flow, Chamber and Brine Recirculation Systems

Again, referring to FIG. 1A, a system and process flow diagram is illustrated presenting an embodiment of the seawater or brine delivery and BRS systems. The seawater or brine 202a from seawater or brine stock tanks or any other brine source 202 passes through pumps (centrifugal pump or positive displacement pump) 210 to deliver feedstock brine to the phase chamber 208. The seawater or brine from the seawater or brine stock tanks 202 has its pressure increased from an initial pressure of 690 to 1375 kPa (100-200 psi) in the feed lines to a chamber input pressure of 1375 to 6700 KPa (200-1,000 psi). As shown, seawater or brine passes through a magnetic device 203 which breaks the chemical bonds of the seawater or brine. Seawater or brine is then pre-heat heat exchanger 204a where it is preheated (preferably from recovered heat from a first stage of condenser 112 to 149-315 C (300-600 F). Seawater or brine passes through heat exchanger 204d where it is further heated from the flue stack heat of the thermal heater 228. Seawater or brine then passes through heat exchanger 204e where any additional heat is added from the thermal heater 228.

The BRS is controlled by a plurality of control valves, wherein the brine passes through the heat exchanger 204F before entering the phase chamber 208. Brine is heated to 250-600F through heat exchanger 204F to equal the temperature of the inside of the chamber using thermal fluids before entering the phase chamber 208.

Figure 2:
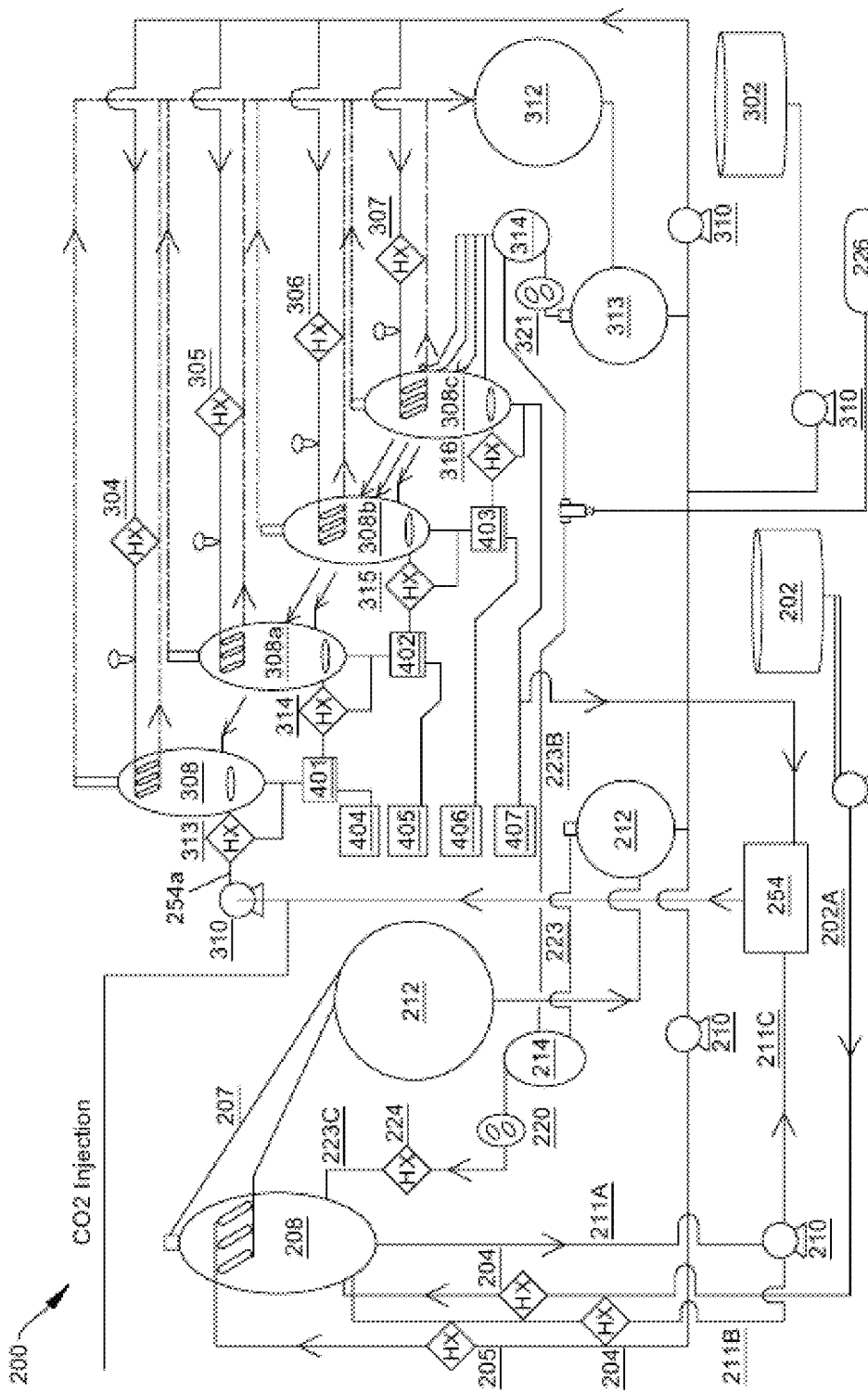
FIG. 2 illustrates the brine waste processing system with several phase chambers in accordance with one embodiment of the invention.

Hot seawater or brine with a temperature ranging from 250-600 enters the phase chamber 208 through a plurality of atomizing nozzles or other atomizing devices to atomize the brine into droplets in the range of 10-120 microns in size. The pressure inside the phase chamber 208 is maintained in a range from 0-30 in Hg. Accordingly, the heated seawater or brine is sprayed into the vacuum condition at an input pressure of 1375 to 6700 KPa (200-1,000 psi) and temperature of 250-600 F resulting in rapid and efficient vaporization of the seawater or brine. This spray atomization and vacuum flashing allows for more efficient separation of the feedstock brine 202a into water vapor 207 and concentrated brine 211a at lower temperatures and with less energy at this stage as compared to a conventional desalinization plant that would operate at a substantially higher temperature to boil the feedstock brine 202a. The water vapor is separated in the phase chamber 208 and passes through a separator 222a (FIG. 4) into a condenser such as a multistage or single stage horizontal or vertical condenser 212. The concentrated brine and mineral molecules drop to the sump 208a (FIG. 4) of the phase chamber 208. Concentrated Brine 211a is removed from the sump 208a, and is pumped and collected into a brine product storage tank 254. From the remaining brine in the chamber, a portion of brine is selectively re-circulated back into the chamber via pumps (e.g., re-circulating centrifugal or positive displacement pump 210) through an atomizing system as described above to further extract fresh water from the brine. Brine collected in the sump 208a is also passed through a heat exchanger 204F (FIG. 2).

The primary objective of the present invention involves a brine waste processing system for incorporation in a desalinization system, the brine waste processing system comprising mainly of a carbon sequestration system along with a at least one brine removal system and a condensing system. Said system allows a sequential series of mineral extraction processes till a stable carbonate product along with a substantially zero brine discharge is achieved.

In various embodiments, the system includes various combinations of the following supporting systems:

a. a condenser 212 connected to the at least one chamber 208 to receive the vapor 207, the condenser 212 having:
   i. a condenser body;
   ii. a sectioned cooling system configured to the condenser body to condense the vapor 207 into one water products;
b. a water vapor collection system for selectively removing the water products;
c. a gas return system configured between the condenser 212 and chamber 208 to return un-condensed gases to the chamber 208; and,
d. a brine collection and recirculation system (BRS) connected to the brine removal system 200 having:
   i. a brine product system for selectively removing water, chemicals, and metal product;
   ii. a brine recirculation system for selectively recirculating a portion of the brine 211b to the chamber 208; where each of the one or more chambers 208, condenser 212 and BRS are connected in a loop.
a. the water vapor return system includes a carrier gas system configured to selectively introduce a carrier gas into the water vapor recirculation system 223.
b. a scrubber unit 226 is connected to the gas trap tank 214 and is configured to selectively bleed excess gases from the loop.
c. a combustion heat from the burner stack is thermally connected to the feedstock brine 202a.
d. a refinery or other waste heat source connected to a heat exchanger to pre-heat the feedstock brine.
e. a multiple of heat exchangers 204a, 204b, 204c, 204d and 204e connected to the feedstock brine system to heat feedstock brine 202a prior to the chamber 208.
f. a singular or multiple magnetic devices 203 to break molecular bonds of the feedstock brine 202a prior to entering the chamber 208.
g. a blower system is configured above the atomizing system (atomizing nozzles 260 or other similar devices) to promote vertical movement of vapor and droplets within the separation chamber 208.
h. a feedstock system having a feedstock storage tank 202 connected to the chamber 208, the feedstock brine system having at least one heater 204a, 204b, 204c, 204d and 204e to preheat the feedstock brine 202a prior to the chamber 208.

Condenser and Water Vapor Recirculation Systems

FIG. 1B is a system and process flow diagram illustrating a multi-stage condenser 212 and corresponding outputs from each stage in accordance with one embodiment. As shown, water vapor from chamber 208 enters the multi-stage or single condenser 212 having at least one section or stage (preferably 3 or more) to condense the vapor. Main blowers 220 and optionally vacuum boosters 220c draw a vacuum in the chamber 208 through the multistage condenser 212 and deliver vapor to the vapor trap tank 214. Vapor from the vapor trap tank 214 passes through an internal or external separator to remove any entrapped gases. Nitrogen and other vapor are circulated from vapor trap tank 214 by main blowers 220. Main blowers 220 increase the velocity and pressure of the gases which are passed through vapor heaters 224 which use thermal fluids or other heating mediums to raise the temperature of the gases to the chamber temperature. Heated gases from the vapor heaters 224 enter the chamber 208 through a plurality of nozzles 260 (FIG. 4) or other process devices from the sides of the chamber 208. These gases pass through the chamber carrying atomized seawater or brine particles at a rate of 3-20 feet per second and reach the separator 222a inside or on top of the chamber 208. Lighter water molecules are passed through the separator 222a, while heavier/larger chemical and metal droplets or molecules impact the separator 222a and fall into the sump 208a of the chamber 208. Additional carrier gas may be introduced via a supplemental carrier gas system 231 (FIG. 1B).

A commercial 3rd party gas scrubber system (FIG. 1B) may be used to reduce GHG emissions to desired levels.

As noted, vapor from the chamber 208 enters the multi-stage condenser 212. The multistage condenser 212 may have one to four sections or stages according to the specifications of the water that are to be produced the multistage condenser 212 can be configured to operate horizontally or vertically. The multistage horizontal condenser condenses side-ways or laterally flowing vapor through a condenser tube, such that the targeted low temperature of the condenser condenses the remaining vapor into bottom section compartments of the condenser. Alternatively, the condenser may be a vertical condenser, in which case vapor is cooled in separate vertically stacked compartments and condensed droplets fall via gravity within each compartment.

As above, each compartment is designed to condense at targeted temperatures to water products that can be collected in storage tanks.

FIG. 1C is a system and process flow diagram like FIG. 1A illustrating the seawater or brine feedstock input system and various heat sources. FIG. 1C illustrates a desalinization feedstock system showing various heat sources from a refinery multistage condenser 112. The third stage of condenser 112 transfers heat to heat exchanger 204a, second stage of the condenser 112 transfers heat to heat exchanger 204b and the first stage of the condenser 112 transfers heat to heat exchanger 204c. The seawater or brine feedstock 202a is further heated from the thermal heater's flue stack heat exchanger 206 which transfers heat to heat exchanger 204d. Thermal heater 228 transfers any additional heat needed to heat seawater or brine feedstock 202a to the operating temperature of 250-600 F through heat exchanger 204e in accordance with one embodiment of the invention.

In various embodiments, the chamber 208 includes various combinations of the following:
a. a feedstock system configured to the chamber 208 for delivering feedstock brine 202a to the chamber 208, the feedstock system having a feedstock storage tank 202 connected to the chamber 208 and at least one heater 204a, 204b, 204c, 204d and 204e to preheat the feedstock prior to entering the chamber.
b. a carrier gas system 231 configured to the chamber 208 for introducing a carrier gas into the chamber 208.
c. a blower system 220 configured above the atomizing nozzles 260 to promote vapor circulation and vapor velocity within the chamber 208.
d. a vapor separator 222a adjacent to the top of the chamber body.
e. a control system operatively connected to the chamber 208 and configured to enable selective control of temperature, pressure, feed rate and flow of vapor in the chamber 208 to set a cut-point in the chamber between the water vapor and brine.

In another aspect, the invention provides a condenser 212 for condensing a water vapor, the condenser 212 including:
a. a condenser body;
b. a sectioned cooling system configured to the condenser body to condense the water vapor into water products;
c. a water collection system for receiving the water products; and,
d. an un-condensed vapor collection system for receiving un-condensed vapor 214 and where the condenser 212 is thermally connected to a separation chamber configured to supply water vapor to the condenser in a closed loop and return un-condensed vapor to the chamber.

In various embodiments, the condenser 212 includes various combinations of the following:
a. the sectioned cooling system is a horizontal condenser 212 configured to condense the water vapor in at least one stage, each stage having a separate compartment for containing a water product.
b. the sectioned cooling system is a vertical condenser 212 configured to condense the water vapor in at least one stage, each stage producing a water product.
c. the temperature of the un-condensed vapor is less than 50° F.
d. the condenser 212 includes one to four stages configured to condense water vapor
e. each stage of the condenser 212 includes a heat exchanger connected to each stage configured to recover heat during condensing and where recovered heat is utilized to preheat a seawater or brine feedstock 202a.

FIG. 2 illustrates a system and process flow diagram illustrating the phase chamber desalination system attached to the brine recycle system BRS in accordance with one embodiment of the present invention, illustrating several phase chambers 308, 308a, 308b, 308c with carbine dioxide CO2 injected into the said systems to process the carbon sequestrated brine or carbon sequestrated brine slurry in accordance with one embodiment of the invention. Brine 211a from the bottom of chamber 208 is pumped 210 to product tank 254 FIG. 1A. Carbon monoxide is pumped through nozzles into brine product tank 254 mixing with the brine. Brine 254a from brine product tank 254 is heated by heat exchangers 313 similar to the first desalinization unit. Hot brine 254a with a temperature ranging from 250-600 F enters the chamber 308 through a plurality of atomizing nozzles or other atomizing devices to atomize the brine to droplets in the range of 10-120 microns in size. The pressure inside the chamber 308 is maintained in a range from 0-30 in Hg. Accordingly, the heated brine is sprayed into the vacuum condition at an input pressure of 1375 to 6700 KPa (200-1,000 psi) and temperature of 250-600 F resulting in rapid and efficient vaporization of the carbon sequestrated brine. This spray atomization and vacuum flashing allows for more efficient separation of the brine and water vapor.

The water vapor leaves the chamber 308 out of the top and is condensed in a condenser 312 configured similar to condenser 212.

Further aspect of the present invention involves brine removal system comprising of one or more phase chamber 308 consisting of atomizing units for effective atomization of the received brine into atomized water vapor and concentrated brine. Said brine removal system is configured sequentially to multiple chambers 308 to allow removal of minerals in each subsequent phase chamber. The primary objective being the processing of the waste brine till the collection of stable industrial product and a substantially zero brine discharge is achieved.

Figure 2A:
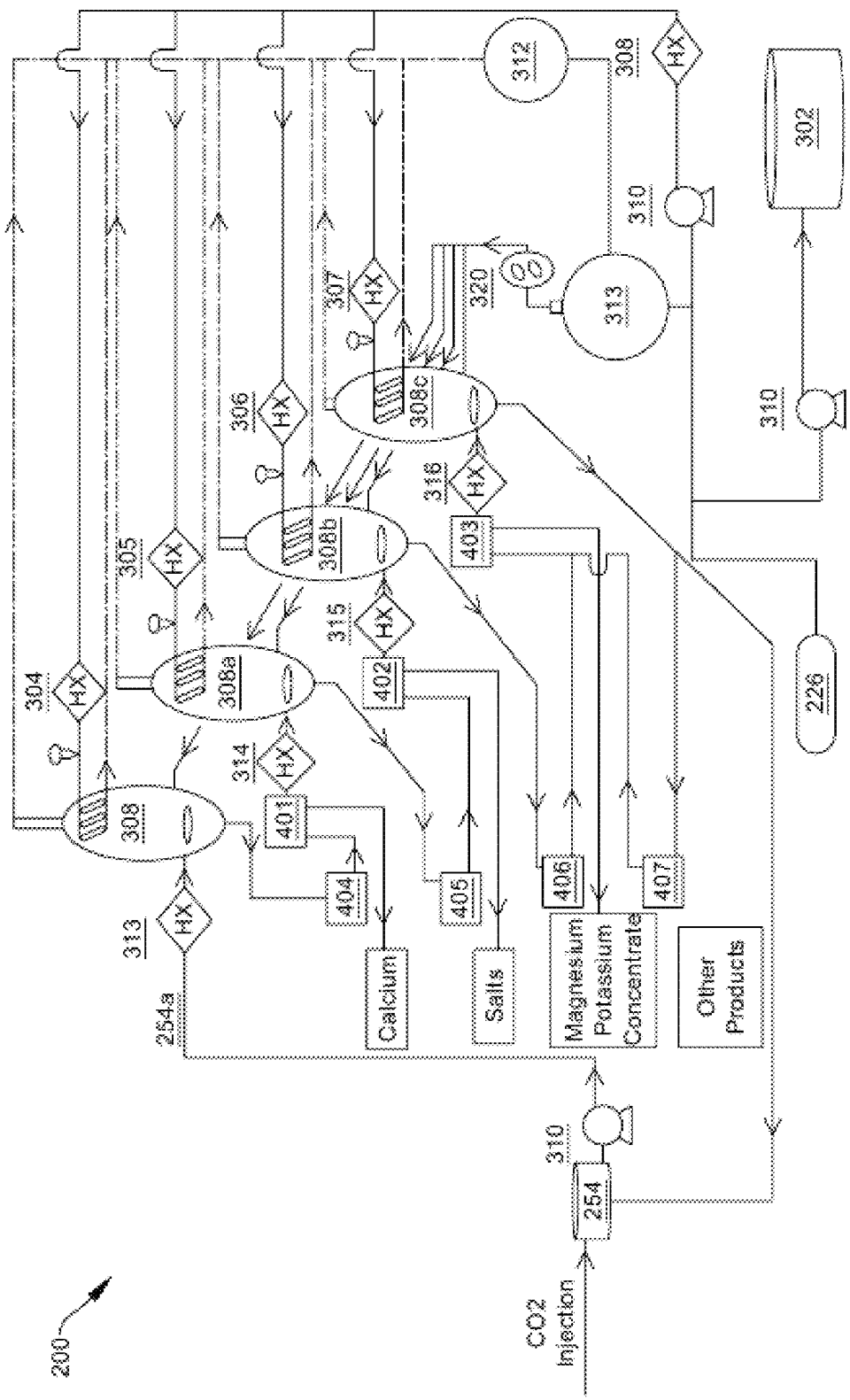
FIG. 2A illustrates a process flow of products produced from brine water in accordance with one embodiment of the invention.

FIG. 2A illustrates a system and process flow diagram illustrating a multistage mineral extraction process where various sources of products produced from brine water utilized in accordance with one embodiment of the invention. Brine 254a pumped from brine tank 254 heated to by heat exchanger 313 prior to entering chamber 308 to be atomized again, freshwater vapor exits the top of chamber 308 increasing the concentration of the brine to approximately 150 g/l. As the high concentration brine drops out of the bottom of chamber 308 it passes through an ion exchange system 404 that removes the Calcium from the brine. Zeolite holds the calcium and allows the brine to pass. After the Calcium is removed from the brine it is passed through ion exchange system 401 where the Calcium is released back into a solution before entering chamber 308a.

Testing has shown without removing the Calcium, increasing the brine concentration leads to sedimentation of salt and minerals. After passing through the ion exchange system 401 temperature of the brine is increased through exchanger 314 into chamber 308a. The same process is repeated through ion exchange system 405 and 402 while adjusting operating conditions targeting different minerals with each stage.

Figure 3:
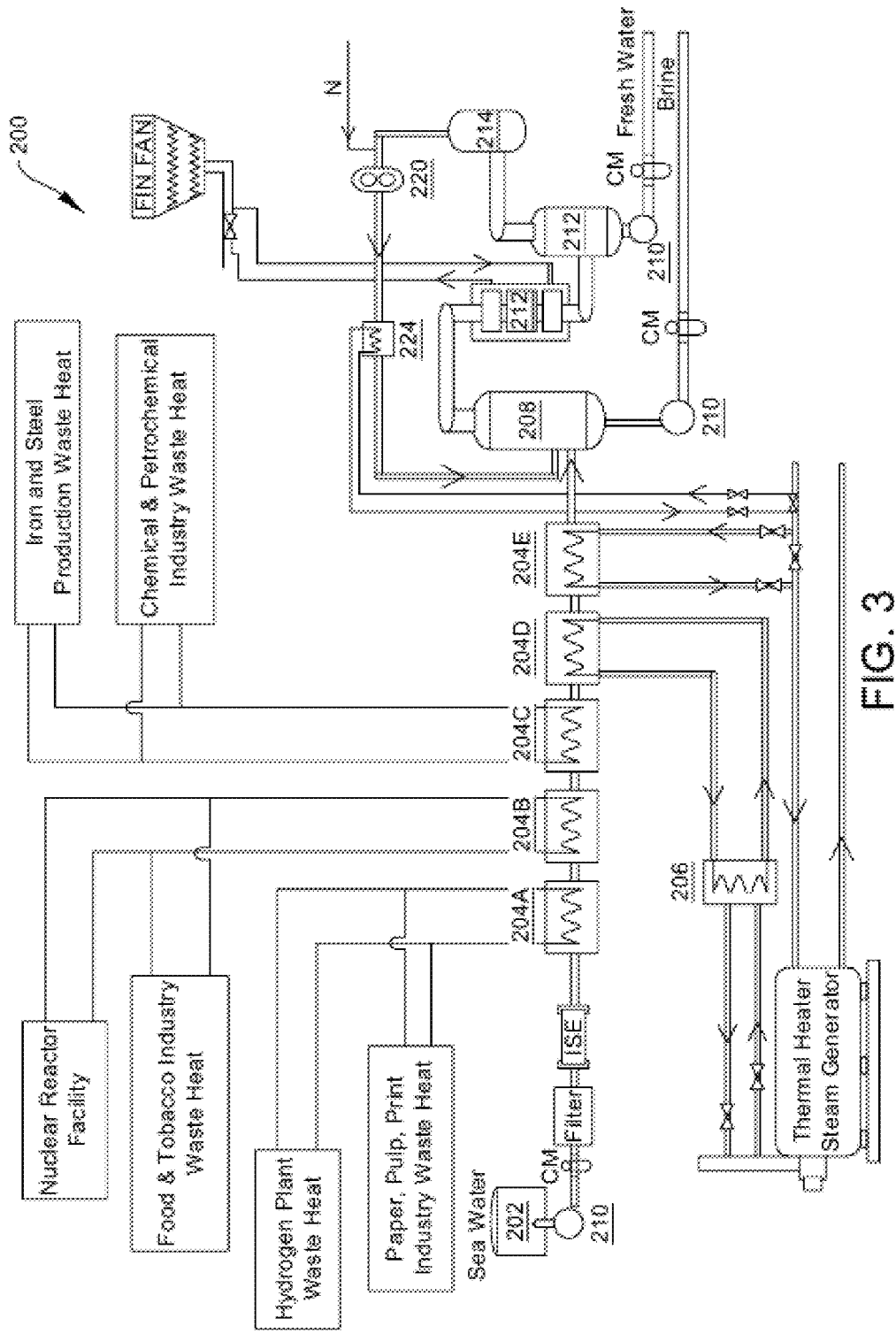
FIG. 3 illustrates a system and process flow diagram illustrating various sources of waste heat extracted from said heat source to heat various desalinization components of the plant in accordance with one embodiment of the invention.

FIG. 3 illustrates a system and process flow diagram illustrating various sources of waste heat extracted from said heat source and used to heat desalinization system in accordance with one embodiment of the invention.

Figure 4:
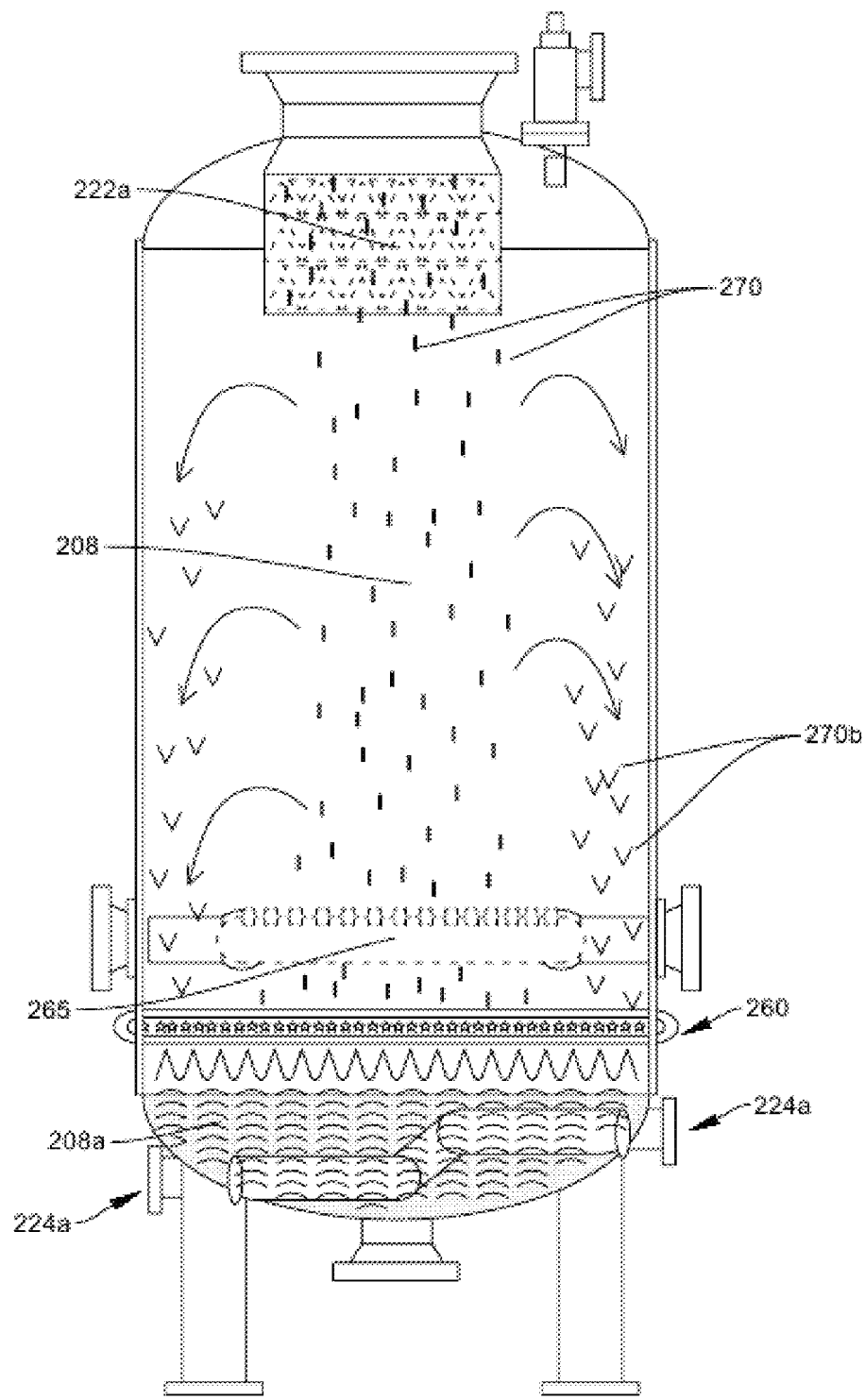
FIG. 4 illustrates process flow diagram illustrating a phase chamber of the brine removal system.

FIG. 4 illustrates a process flow diagram illustrating a separator chamber. The separator chamber includes a liquid atomizing ring 260, a gas ring 265 and an internal separator 222a. The separator chamber further includes a brine sump 208a and a heating coil 224a to heat the brine sump. Further, an atomization zone is shown with water vapor 270 leaving the chamber and a drop zone showing the brine 270b falling into the brine sump.

Chamber Design

FIG. 4 illustrates an embodiment of the phase chamber 208. As described above, hot seawater or brine feedstock 202a from the seawater or brine feed tank 202 (FIG. 1A) enters the chamber 208 with an input pressure of 1375 to 6700 KPa (200-1,000 psi) through plurality of nozzles or other process devices designed to atomize the seawater or brine to droplets in the range of 10-120 microns in size. These droplets are sprayed into the chamber under a vacuum, preferably from 0-30 in Hg, which causes rapid and efficient vaporization of the water vapor 270a. This spray atomization and vacuum flashing in the chamber enables efficient separation of the feedstock brine into water vapor 270 and brine 270a at lower temperatures. In addition, vapor from a vapor trap tank or gas separator 214 enters the chamber through one or more blowers 220. The blower(s) with returned gases circulates the atomized droplets 270 at a velocity of 3-20 feet per second to the separator 222a located inside the chamber 208, where water vapor 270a of the water vapor molecules pass through the separator 222a and are delivered to the condenser 212. The separator 222a together with vertical movement of droplets or vapor in the chamber causes heavier chemical and metal molecules 270b of the brine solution to fall down the sides of the chamber as shown by the arrows to be collected in the sump 208a of the chamber. A portion of the brine solution collected in the sump 208a can be re-circulated back into the chamber using a pump 210 for further processing to separate additional water vapor. After the recycling step, the brine is delivered to the brine product tanks 254.

The Phase Chamber 208, 308 body size can range from 6 to 12 feet wide and 8 to 20 feet tall made from a corrosive resistant material such as stainless steel in the shape of a cylinder with a dome top. There are three zones inside the chamber 208, 308, an Atomization Zone, a Drop Zone, and a Collection Zone. The Atomization Zone is the area through the center of the vessel that includes a polarity of fine liquid atomizing nozzles as well as high velocity air nozzles configured in a pattern as to create an accelerated directional vapor stream. Testing has shown the most efficient separation of seawater or brine droplets occurs when atomized to a specific size and channeled from the atomization zone in the form of a vapor stream through the center of the chamber. The velocity of the vapor stream is such as to allow only targeted clean water to be carried upward. The Drop Zone is created by a low velocity area around the vessel wall free of vapor allowing for heavier sodium, chlorides, manganese and other chemicals and metals to fall into the Collection Zone. The Collection Zone is the area at the bottom of the chamber where concentrated sodium chloride and other chemicals are collected and processed to finished product.

The Phase Chamber 208 is fed with seawater or brine with a feed pump operated by a variable speed drive controlling the flow rate and nozzle pressure. The seawater or brine passes through a separation enhancer or a magnetic device 203 that creates a magnetic field using polarities and frequencies that strip electrons from the sodium chlorides by breaking molecular bonds. The seawater or brine passes through a series of heat exchangers operated at different temperatures. Heat exchanger #1 increases the seawater or brine temperature by 65-85% circulating hot water transferring heat from the Condensate Condenser or the distillation tower. Heat exchanger #2 further increases the temperature of the seawater or brine using media from a heating source such as capturing heat from a thermal heater exhaust flu stack or heated thermal fluid. The feed pump increases the pressure of the seawater or brine between 200-1000 psig entering the phase chamber 208 through the feed nozzles. Superheated seawater or brine enters the chamber at a temperature between 250-600 F, usually around 350 F. The primary blowers or other devices draw a vacuum on the chamber between 0-30 in Hg. The large differential pressure drop across the nozzle orifice inside the chamber under vacuum significantly reduces the boiling point of the seawater or brine or wastewater instantly causing the droplets to flash and atomize.

Testing has proven that atomizing seawater or brine smaller than 10 uc had an adverse effect on the efficiency of the separation process. Testing has also proven that atomizing saltwater into droplets larger than 140 uc causes incomplete separation of the molecules causing significant drop in the yield of fresh water. Towards this end, the system utilizes atomizing nozzles producing droplets between 10 uc to 120 uc most commonly in the 65 uc range. The vacuum flashing and spray separation of the 65 uc range droplets inside the phase chamber 208 increases the surface area and forms even smaller vapor particles or fractions with complete atomization and or separation of molecules.

Yet another aspect of the invention involves a brine waste processing method comprising a series of steps involving
 a. receiving a brine from a brine source 254 for carbon sequestrating in a chamber 308 by mixing the brine with at least one of carbon dioxide or carbon monoxide and producing carbon sequestrated brine 254a;
 b. atomizing the carbon sequestrated brine 254a for spray atomization and vacuum flashing of carbon sequestrated brine 254a in the chamber 308 for generating rapid surface-area of the brine slurry and separating concentrated brine and a water vapor from the carbon sequestrated brine 254a under predefined conditions;
 c. collecting the water vapor from condensed water vapor for providing fresh water via a condenser 312 configured to the chamber 308;
 d. collecting uncondensed water vapor from the condenser to the chamber 308 via a water vapor gas return system having a gas trap configured to the condenser 312; and
 e. processing sequentially the concentrated brine, wherein the processing includes extracting one or more minerals from the concentrated brine in one or more steps till a stable carbonate product/and a substantially zero brine discharge is received.

System Control

A control system is operatively connected to the system and configured to enable selective control of temperature, pressure, seawater or brine feed rate and flow of vapor in the chamber 208, 308 to set a cut-point in the chamber between the water vapor and the brine system System control is accomplished by the variable speed pumps, blowers, automated control valves, safety valves and heat exchangers as described above, together with appropriate temperature, pressure, flow, density, Coriolis meters, vortex flow meters and other sensors throughout the system. Typically, the seawater or brine feedstock, the chamber is controlled to effect brine solution and water vapor separation at a chosen cut point to optimize water production.

Generally, different seawater or brine feed stocks 202a having different sodium chloride concentration enable production of different proportions of brine solution 211a, 270b and water vapor 207, 270. Thus, based on the feedstock brine 202a, the temperature, pressure, and flow rates are controlled with appropriate feedbacks throughout the systems 200 to provide sufficient residence times in each of the chamber 208, 308, BRS, condenser 212, 312 and WVRS 223 to:
 a) provide separation of the brine 270b and water vapor 270 in the chamber at the desired cut point, and
 b) condensation of water vapor in the condenser 212, 312 at the desired product compositions.

The control system is operatively connected to the system 200 and configured to enable selective control of a feedstock flow rate into the chamber 208, 308, a brine recirculation rate into the chamber 208, 308 and a brine product removal rate from the system 200.

The control system is configured to enable flash atomization of the feedstock brine at a chamber pressure of 0-30 in Hg.

The atomizing system includes a plurality of atomizing nozzles 260 and the control system and atomizing system are configured to introduce feedstock brine 202a, 254a through the atomizing nozzles at 1375 to 6700 KPa (200-1,000 psi).

The control system and atomizing nozzles are configured to introduce returned brine through the atomizing nozzles at 1375 to 6700 KPa (200-1,000 psi).

The control system and atomizing system are configured to eject feedstock brine 202a, 254a into the chamber 208, 308 with a droplet size diameter of 10-120 microns.

The control system and blower system 220 are configured to induce vapor flow within the chamber 208, 308 at a rate of 3-20 feet/second.

The control system and temperature control system of brine feed is maintained in the operating range of 250-600 F.

A gas distribution manifold is located above the brine sump level just above the liquid nozzle ring 260. Testing has shown by locating the gas manifold above the liquid nozzles significantly reduces the saturation of the gas, restricting its ability to act as a carrier. The primary blowers 220 draw a vacuum of 0-30 Hg creating a velocity around 3-20 feet per second (FPS) through the gas trap tank, condenser 212, 312, phase chamber 208, 308 completing the vapor loop.

Gas passes through the primary blower 220 followed by a thermal heat exchanger 224 and into the phase chamber 208 through the gas manifold to complete the loop. Using a control system to regulate the gas exiting the blowers 220 and passing through heat exchangers 224 where the gas is heated to or above the chamber operating temperature thus reducing the chance of quenching the vapor. Testing has shown that reheating the gas to or above operating temperature prior to its entry into the chamber 208 increases the separation rate and the degree of separation of the seawater or brine resulting in a higher yield of freshwater. The heated gas enters the chamber from opposite sides through a gas manifold which evenly distributes the gas. A velocity of 3 to 20 FPS is maintained in the chamber 208 to remove water vapor through the separator into the reverse condensate condenser for water condensing.

The uncondensed gases from the condenser 212 have a temperature less than 10° C. (50° F.).

The water vapor gas return system 223 includes a gas trap connected to the condenser 212 to separate uncondensed gases from the condenser 212 as the uncondensed water vapor.

The Phase Chamber 208 and system 200 can desalinate seawater or brine 202a as well as extract freshwater from wastewater and brine. When seawater or brine 202a is processed, excess gasses are removed from the system through a small secondary blower or vacuum pump attached to the gas trap tank. The purpose of this piece of equipment is to maintain correct gas composition in the loop as well as vacuum in the chamber. Gas removed from the gas loop by the secondary blower is sent to a scrubber 226 and vented to atmosphere.

Testing has shown when processing seawater or brine a carrier gas such as nitrogen may be added to maintain proper gas loop volume. The makeup gas is added prior to the suction of the primary blowers to ensure gas is heated to or above the operating temperature in the chamber. Makeup gas is never injected into liquid.

The Brine Recycle System (BRS) recycle system is a secondary separation system fed by the brine 211b discharge from the phase chamber 208 that further separates out freshwater from the brine. The BRS system a series of independently controlled separator vessels each one operated at a different temperature and pressure configuration targeting the removal of specific minerals The BRS has proven the ability to dissect the seawater or brine resulting in an additional 40-45% yield of freshwater than the phase chamber 208 alone. The BRS can be automated or operated manually; it can also be operated independently and in conjunction of the phase chamber system 208. The BRS can draw feed from the phase chamber sump 208a or a separate source. The BRS has proven to separate the sodium, chlorides, and other chemicals without interrupting the phase chamber system process.

The BRS includes monitoring devices for pressure, temperature, flow rate, and viscosity. A variable speed drive (VFD) to control the systems pressure and flow rate, a dedicated pump to remove the liquid brine 211a from the sump 208a of the phase chamber 208, piping to connect the pump to the BRS exchanger and to the independent BRS ring located in the atomizing zone of the chamber 208.

Through testing in a controlled environment, it was found that atomizing seawater, brine or wastewater at a specific temperature and pressure into droplets ranging from 10 uc to 120 uc inside a pressure-controlled chamber with the presence of directional high velocity carrier gas ranging from 3-20 feet per second instantly removed water molecules.

The system includes at least two production units configured to a feedstock brine system in parallel, the feedstock brine system having a single feedstock storage tank connected to each production unit.

In another aspect, each production unit has a feedstock processing capacity of 125,000 to 170000 gallons per day and two or more production units are connected in parallel to a common feedstock delivery system and product storage system.

Modular Deployment

In another aspect, the invention provides a network of modular desalination systems comprising a plurality of geographically distributed production units and each production unit are connected in parallel and have a common feedstock brine delivery system and product storage system.

Further, in another aspect of the present invention is provided a network of modular desalination systems comprising a plurality of geographically distributed production units and each production unit are connected to differing feedstock delivery systems and connected to common product storage systems.

The phase chamber is designed at a scale for efficient and economic deployment and to enable further scaling of the system. Generally, as noted above and illustrated in FIG. 3, the phase chamber can be deployed in a wider range of locations compared to conventional desalinization and brine technology due to the scalability of a chamber and the lack of emissions.

The optimal size of a phase chamber production unit PU (FIG. 1) is based on a phase chamber designed to process about 126,000-420000 gpd of seawater or brine feedstock. Based on flow volumes of fluids or gases and the requirement for pumps and blowers to provide both flow rates and maintain phase chamber operating conditions together with economic considerations, larger phase chambers can be built, larger capacity pumps, blowers and piping would be required to enable chamber operating conditions at higher throughputs. As such, in deployments where a larger capacity throughput is required, individual production units including phase chambers, condensers and brine solution and water vapor recirculation systems can be integrated and connected in parallel where each production unit shares feedstock delivery systems or tanks, product tanks, carrier gas systems, scrubber removal systems.

As such, depending on available land, multiple production units can be integrated to increase the overall capacity of the plant to match the market needs.

In various embodiments, multiple production units can be deployed together with shared equipment as noted above. Importantly, modular integration of production units allows operators to scale-up (as well as scale-down) operations based on changing market conditions. For example, if a market is growing or shrinking after deployment, additional production units can be added or removed from a facility in discrete volumes allowing operators to adjust to local market conditions more readily.

Technical Advancement

The present invention generally relates to the field of desalination of ocean water, brackish water, industrial waste-water or petroleum-contaminated produced-waters from oil and gas operations, and more particularly to thermal desalination and zero-brine-discharge ZBD dewatering systems and methods to extract the by-products of desalinated freshwater and the dewatered mineral and metal constituents of the waste-brine, thereby reducing the cost of producing new freshwater supplies and reducing industrial carbon emissions in the process.

In addition, the desalination process and systems as described herein have several technical advantages over conventional desalination processes that are typically pollution-intensive, generating brine discharge which causes seawater pollution and uses various combinations of high-temperature and pressure processes As described herein, the phase chamber system is less complex, operates at lower temperatures and lower pressures than conventional desalination and can provide a safer, lower energy and less costly plant to build and operate. Furthermore, the chamber system achieves substantially zero-emissions by effective recycling of process gases in a closed-loop system. Importantly, the only emissions are from process heaters used to generate process heat that is external to a closed loop refining process. This process heater flue heat is further used to pre-heat seawater or brine feedstock. Moreover, these external emissions can be captured or scrubbed with other capturing or scrubbing systems.

The phase chamber units can be constructed next to any major heat source on a coast to produce water and brine products without threatening the local environment with toxic emissions that are typically associated with oil refineries connected to desalination plants.

Sodium Carbonate can be mixed with waste-brine to remove scale-forming Calcium from the Brine stream and produce eco-friendly bricks and building materials made of Carbonate crystal-forming structures stronger than higher cost energy-intensive and emissions-intensive Portland Cement.

Testing has shown as much as a 35-40% reduction in energy consumed by refinery cooling equipment through this process.

Instead of solely employing Portland cement which releases carbon dioxide as it hardens over its lifetime, there are new eco-friendly cement alternatives, like Magnesium Oxide cement that are just as strong or stronger than Portland cement, requires much less heat to produce, and absorbs carbon dioxide over time to actually gain strength, potentially making it a carbon-negative building material, which would enable the building industry to significantly reduce its associated emissions, both by reducing the amount of carbon needed to produce the cement, and by its concrete structures pulling excess carbon from the atmosphere over time.

The foregoing description of the specific embodiments reveals the general nature of the embodiments herein that others can, by applying current knowledge, readily modify and or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the appended claims.

The invention claimed is:

1. A brine waste processing system for incorporation in a desalinization plant, the brine waste processing system comprising:
    a. a carbon sequestration system configured to receive feedstock brine from a brine source and inject at least one of carbon dioxide or carbon monoxide into the feedstock brine to provide carbon sequestrated brine;
    b. a plurality of brine removal systems connected in series or parallel sequentially extract brine and water vapor from the carbon: sequestrated brine, wherein each of the brine removal systems includes a brine product system having a phase chamber with at least one atomizing unit configured to atomize the carbon sequestrated brine into concentrated brine and water vapor, wherein each subsequent brine removal system includes at least one mineral extraction unit to extract one or more minerals from the concentrated brine received from a previous brine removal system to provide a stable carbonate product and a substantially zero brine discharge.

2. The brine waste processing system as claimed in claim 1, wherein the brine removal system comprises:
    a brine recirculation system for recirculating a part of the concentrated brine to the chamber, the rest of the concentrated brine being fed to a second brine removal system flow connected to the first brine removal system for further brine removal.

3. The brine waste processing system as claimed in claim 1, wherein each brine removal system comprises a condensing system for condensing the water vapor into fresh water, wherein the fresh water is delivered to a water storage tank.

4. The brine waste processing system as claimed in claim 1, wherein the system comprises at least one waste heat source.

5. The brine waste processing system as claimed in claim 1, wherein the mineral extraction unit comprises an ion exchange system, wherein the ion exchange system of each subsequent brine removal system is configured to extract a mineral from the concentrated brine collected from the previous brine removal system.

6. The brine waste processing system as claimed in claim 1, wherein the carbon sequestration system receives the heat from at least one heat source for heating the carbon sequestrated brine prior to introducing the carbon sequestrated brine into the brine removal system.

7. The brine waste processing system as claimed in claim 1, wherein the brine waste processing system comprises at least one magnetic device to break molecular bonds of the brine, wherein the brine from the brine source is passed through the at least one magnetic device prior to introduction into the chamber.

8. A brine removal system comprising:
    a. a plurality of brine phase chambers configured to receive carbon-sequestrated brine and separate water from the carbon-sequestrated brine stage-wise to provide concentrated brine and fresh water, wherein each brine phase chamber comprises:
    b. at least one atomizing unit for atomizing the received carbon-sequestrated brine into an atomized water vapor and concentrated brine,
    c. wherein the concentrated brine received from a first of the plurality of brine phase chambers is transferred to a next brine phase chamber to sequentially remove, by a mineral extraction unit, one or more minerals from the concentrated brine in each subsequent brine phase chamber till the collection of a stable carbonate product and a substantially zero brine discharge is received.

9. The brine removal system as claimed in claim 8, wherein the atomizing unit allows spray atomization and vacuum flashing of the carbon sequestrated brine as received, via a plurality of atomizing nozzles, under predefined conditions, to provide atomized water vapor.

10. The brine removal system as claimed in claim 8 comprising a water vapor gas return system having a gas trap configured to a condenser.

11. The brine removal system as claimed in claim 8 further comprising a control system for selectively controlling predefined conditions including at least one of a temperature, a chamber pressure, brine flow rate and a vapor flow rate in the chamber for setting residence times in the chamber between the water vapor and brine solution.

12. The brine removal system as claimed in claim 11, wherein the predefined conditions are maintained by selecting a temperature in a range of 250-600 F, the chamber input pressure in a range of 1375 to 6700 KPa and the pressure of the chamber in a range of 0-30 in Hg during flash atomization of the carbon sequestrated brine.

13. The brine removal system as claimed in claim 8 further comprising a blower system within each of the brine phase chambers to maintain a vapor flow rate within the chamber in the range of 3-20 feet/second.

14. A brine waste processing method comprising:
    a. receiving a brine from a brine source;
    b. carbon sequestrating the brine with at least one of carbon dioxide and carbon monoxide to provide carbon sequestrated brine;
    c. atomizing the carbon sequestrated brine by spray atomization and vacuum flashing in a plurality of brine phase chambers serially or parallelly connected to one another, stage-wise to separate a concentrated brine solution and water vapor, under predefined conditions;
    d. collecting the water vapor for condensation to provide fresh water;
    e. extracting one or more minerals from the concentrated brine received from a previous brine phase chamber till a stable carbonate product/and a substantially zero brine discharge is received.

15. The brine waste processing method as claimed in claim 14, wherein the collecting comprises recirculating uncondensed water vapor to the chamber 4.

16. The brine waste processing method as claimed in claim 14 further comprising the step of recirculating a portion of the concentrated brine to the chamber for re-atomization.

17. The brine waste processing method as claimed in claim 14 further comprising the step of mixing the uncondensed vapor with a carrier gas and introducing the mixture into the chamber, wherein the carrier gas is an inert gas.

18. The brine waste processing method as claimed in claim 14 further comprising the step of bleeding excess gases out of the condenser, to a scrubber unit and venting to atmosphere.

19. The brine waste processing method as claimed in claim 14 further comprising the step of independently controlling a brine flow rate, a brine solution recirculation rate and a brine product removal rate.

20. The brine waste processing method as claimed in claim 14, wherein the extracting comprises extraction technologies selected from at least one of a centrifuge, electro dialysis, membranes, nano-filters, ion exchange, ultrasonics and solvent-extraction, precipitation mineralization and crystallization technologies in sequence.

* * * * *